United States Patent [19]

Roman

[11] Patent Number: 5,003,289

[45] Date of Patent: Mar. 26, 1991

[54] U-TURN SIGNAL ATTACHMENT

[76] Inventor: Leonard E. Roman, 601 SW., 123 Ave., Miami, Fla. 33184

[21] Appl. No.: 549,585

[22] Filed: Jul. 6, 1990

[51] Int. Cl.$^5$ ............................................. B60Q 1/34
[52] U.S. Cl. ................................... 340/468; 340/468; 362/80.1
[58] Field of Search ............... 340/475, 472, 468, 465, 340/479; 362/80.1, 61, 80; 40/556, 573, 574, 591, 593

[56] References Cited

U.S. PATENT DOCUMENTS

| | | | |
|---|---|---|---|
| 2,453,421 | 11/1948 | Dyer | 362/351 X |
| 4,387,361 | 6/1983 | Reed | 340/475 |
| 4,734,675 | 3/1988 | Wen | 340/479 |
| 4,868,541 | 9/1989 | Sullivan et al. | 340/465 |

*Primary Examiner*—Joseph A. Orsino
*Assistant Examiner*—B. R. Tumm

[57] ABSTRACT

An auxiliary U-turn signal indicating light attachment having a generally U-shaped housing designed to be mounted on the lower left corner of the rear window of a vehicle, wherein an indicating light compartment encloses a U-turn signal indicating lamp. A manually operated switching apparatus for energizing the U-turn signal lamp is adapted for mounting on and interconnection with a conventional turn signal lever. A mounting bracket is pivotally secured to a rod slidably received within an apertured mounting tab within the housing, wherein a set screw associated with the mounting tab is utilized to secure the rod in a selected adjusted position. By virtue of this arrangement, the elevation and inclination of the housing on the intended mounting surface can be varied to enable usage with a wide variety of differently configured vehicles.

1 Claim, 1 Drawing Sheet

U-TURN SIGNAL ATTACHMENT

FIELD OF THE INVENTION

The present invention relates to auxiliary indicating light attachments, and more particularly, to a U-turn signal attachment adapted for mounting on the rear deck adjacent the rear window of a vehicle. Conventional turn signals neglect the necessity of communicating to the following traffic the intentions of a driver when preparing to make a U-turn instead of a left turn. The flashing of the U-turn signal lamp of the present invention indicates a more cautious signal during a lengthier turning period required to make a U-turn, making it understood to the impatient following driver the importance of not approaching too close, and the necessity of leaving more room to allow for the U-turn. This hazard is frequently experienced by truck drivers, taxis, and delivery personnel to whom this auxiliary indicating light attachment would be essential. In order to overcome these problems, the present invention provides an auxiliary U-turn signal indicating light attachment, adapted to be mounted at eye level on the rear deck adjacent the rear window of an automobile, on a truck bed, the back of a truck cab or on the body frame. Motorcycles will find this indicating light attachment helpful also. Federal Motor Vehicle Standards now require that currently manufactured vehicles be provided with an eye level supplemental or auxiliary brake light mounted within the rear area of the vehicle such as a window, window deck or encased in the vehicle's body frame. Numerous illumination devices have been provided in the prior art that are adapted for viewing information and the like to indicate or transfer a message to other vehicles regarding the intentions of the driver, but the frequently executed U-turn has only been announced or indicated with the use of the left turn signal for lack of a proper U-turn indication. The present invention provides a driver with a U-turn signal indicating light attachment that has not previously been provided in the prior art.

DESCRIPTION OF THE PRIOR ART

Various relevant prior art lighting and signaling systems and the like, as well as apparatus and methods of their construction in general, are found to be known and exemplary in the following U.S. prior art: Fasel, U.S. Pat. No. 4,896,251; Gabaldon, U.S. Pat. No. 4,758,931; and Simidian, U.S. Pat. No. 4,736,280. These patents, and other known prior signaling devices, reveal various types of rear-end lighting or signaling systems of various manufactures and methods of their construction. While these units may be suitable for their particular purpose to which they address, none of them, whether taken singularly or in combination, disclose the specific function or purpose of the present invention in such a way as to bear upon the claims of the present invention to be disclosed herein.

SUMMARY OF THE INVENTION

In view of the foregoing disadvantages inherent in the known types of conventional auxiliary indicating light attachments now present in the prior art, the present invention provides a preferred means of indicating the U-turn with an auxiliary U-turn signal attachment.

As such, the general purpose of the, present invention, which will be described subsequently in greater detail, is to provide the new auxiliary U-turn signal attachment which has as one advantage, the communicating to the following vehicle the intentions of the driver when preparing to make a U-turn.

To attain this, a representative embodiment of the concept of the present invention is illustrated in the drawings comprising a generally U-shaped box-like housing surrounding an indicating light compartment which encloses a U-turn signal indicating light. A mounting bracket is pivotally secured to a rod slidably received within an apertured mounting tab on the housing. A set screw associated with the mounting tab is utilized to secure the rod in a selected adjusted position. By virtue of this arrangement, the elevation and inclination of the housing may be adjusted with respect to the intended mounting surface to enable usage with a wide variety of differently configured vehicles.

A manually energized magnetic switch (not shown) adapted for mounting on the vehicle's conventional indicating turn signal lever and connected in a conventional fashion to the electrical system of the vehicle is the switching apparatus for energizing the U-turn light bulb upon operating the vehicle's turn signal lever to a predetermined operating position. The switch disengages automatically with the conventional left turn signal upon completion of the U-turn.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangement of components set forth in the following description or illustrated in the drawings. The invention is capable of other embodiments and of being practiced and carried out in various ways in the case of the invention being adopted by the Federal Motor Vehicle Standards, as required by law, or just as an extra feature on manufactured vehicles in which case, the housing would be unnecessary and as long as its main function remains the same, its placing, installment or adaptation would be left to the discretion of the future engineers, designers, and practitioners in the art. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the purpose of the present invention. It is important, therefore, that the claims be regarded as including such equivalent constructions insofar as they do not depart from the spirit and scope of the present invention.

Further, the purpose of the foregoing abstract is to enable the public, generally, and especially, the scientists, engineers and practitioners in the art who are not familiar with patent or legal terms or phraseology to determine quickly from a cursory inspection the nature and essence of the technical disclosure of the application. The abstract is neither intended to define the invention of the application, which is measured by the claims, nor is it intended to be limiting as to the scope of the invention in any way.

It is, therefore, an object of the present invention to provide the new auxiliary U-turn signal attachment that has as an advantage over the prior art, an auxiliary indicating light attachment which will better indicate and distinguish between the making of a normal left turn and a U-turn.

It is another object of the present invention to provide the new auxiliary U-turn signal attachment which may be adapted for use in a wide variety of models of automobiles.

It is a further object of the present invention to provide the new auxiliary U-turn signal attachment which is of a durable and reliable construction.

An even further object of the present invention is to provide the new auxiliary U-turn signal attachment which is susceptible of a low cost manufacture with regard to both materials and labor, and which, accordingly, is then susceptible of low prices of sale to the consuming public, thereby making such auxiliary indicating light attachments economically available to the buying public.

Still yet another object of the present invention is to provide the new auxiliary U-turn signal attachment as a supplemental indicating lamp desirable for safety reasons.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be made to the accompanying drawings and descriptive matter in which there is illustrated a preferred embodiment of the invention.

BRIEF DESCRIPTION OF THE DRAWINGS

The invention will be better understood and objects than those set forth above will become apparent when consideration is given to the following detailed description taken in connection with the accompanying drawings in which.

DESCRIPTION OF THE PREFERRED EMBODIMENT

Figure 2:
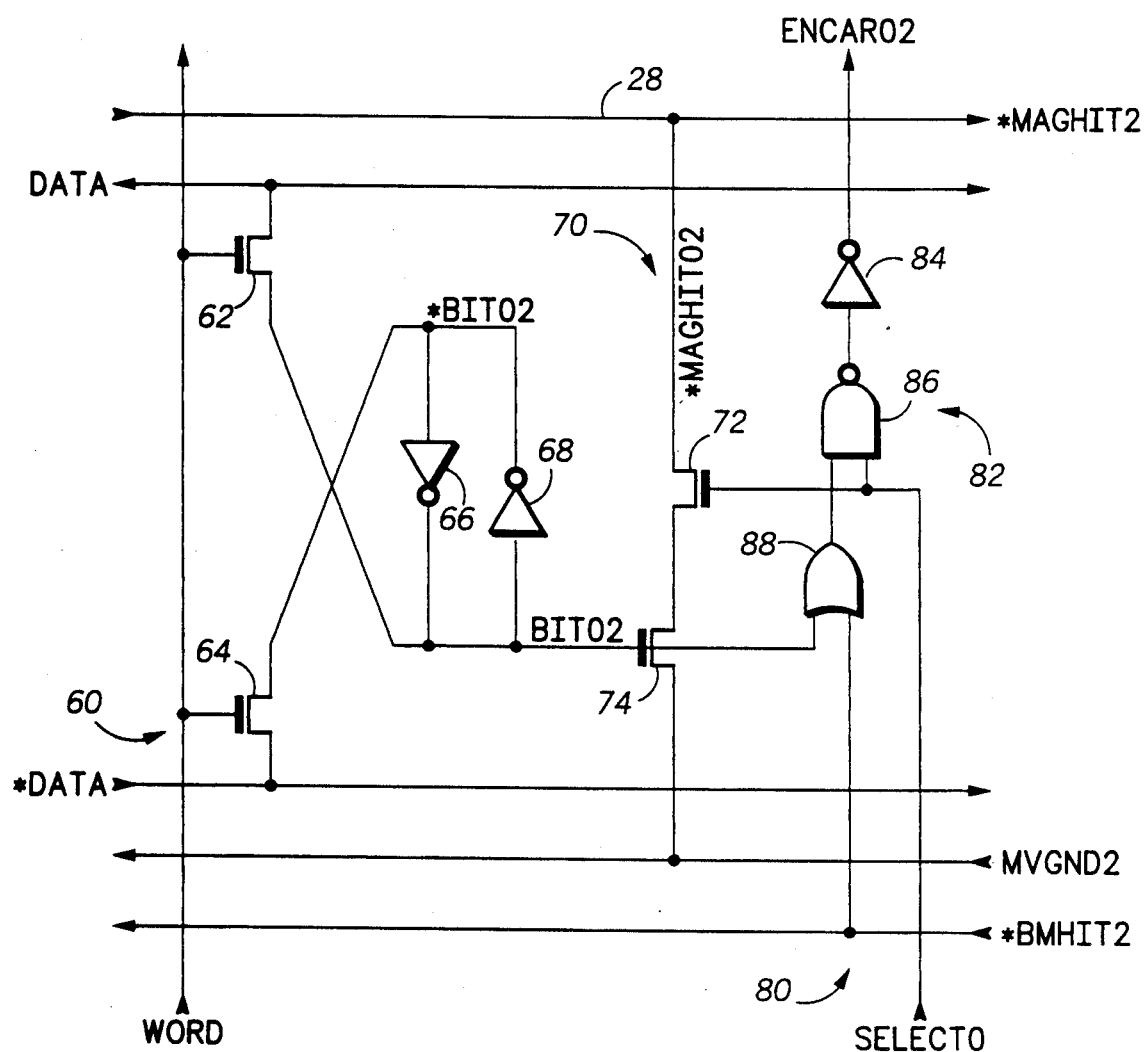
FIG. 2 is a transverse cross-sectional view taken along line 10—10 of FIG. 1.

Turning now descriptively to the drawings, FIGS. 1 through 5 illustrate the new auxiliary U-turn signal attachment embodying the principles and concepts of the present invention being generally designated by the reference numeral 10.

Figure 1:
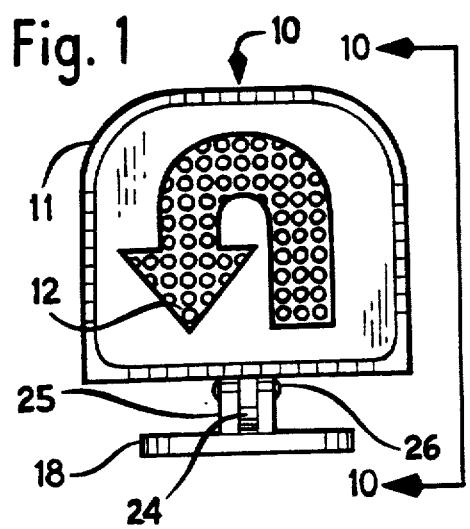
FIG. 1 is a front view of the indicating light attachment according to the embodiment of the present invention.
Figure 2:
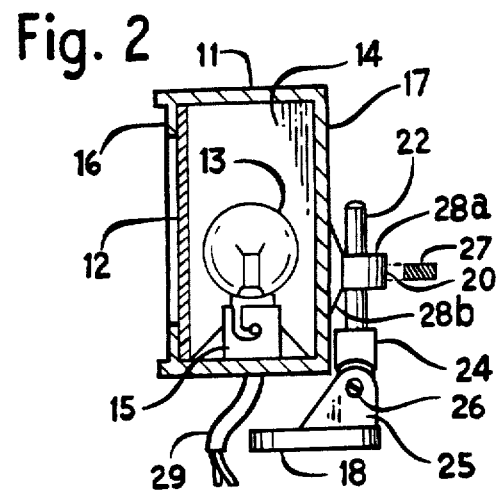
Figure 5:
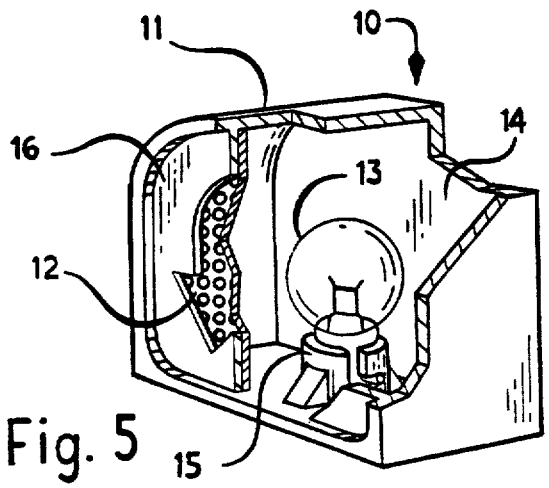
FIG. 5 is a detail perspective view in partial cutaway illustrating the interior construction of the device of FIG. 1 with the indicating light compartment lens cover partially removed.

More specifically, it will be noted that the embodiment 10 shown in FIG. 1 of the invention includes a generally U-shaped housing 11. A front outer wall 16 having a light lens 12 made of a light transmissive means such as translucent plastic protrudes from the housing. The front wall encloses the housing interior 14 as shown in FIGS. 2 and 5, wherein a lamp socket 15 with its correspondent indicating light bulb 13 is fitted within the housing 11. The opaque front outer wall 16 is hollowed-out with a U-shaped arrow and the lens 12 is adhered to the wall 16 providing a translucent light emitting window configured as the indicating U-turn arrow.

Figure 4:
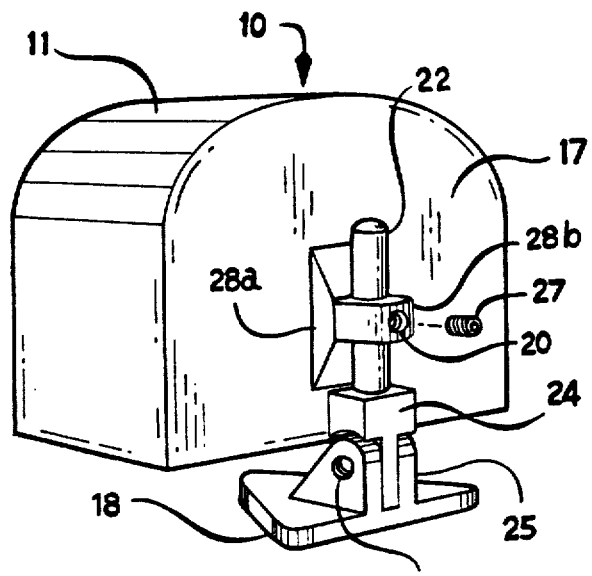
FIG. 4 is a perspective rear view illustrating the adjustable mounting bracket of the device of FIG. 2.

FIG. 2 depicts a cross-sectional view taken along line 10—10 of FIG. 1 illustrating the interior Construction of the embodiment 10 of the invention wherein a mounting rod 22 is received through a cylindrical central bore of a mounting tab 28A secured to the rear wall 17 of the housing 11. A set screw 27 in the mounting tab 28A is utilized to clamp the rod 22 in a selected, adjusted position. As illustrated in FIG. 4, the pivotal mounting pin 26, in conjunction with the vertically adjustable mounting rod 22, provides for an adjustment of the elevation and inclination of the housing 11 with respect to the horizontal surface of the mounting bracket 18 which, in use, is secured on the horizontal rear deck surface of a vehicle.

Figure 3:
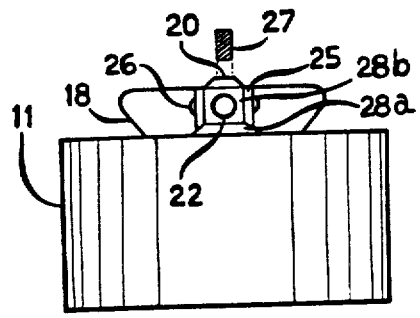
FIG. 3 is a top view of the device of FIG. 1.

FIG. 3 provides a top view of the embodiment 10. The mounting bracket arrangement is identically formed with respect to the mounting bracket of the embodiment 10, previously described with reference to FIG. 2.

As shown in the rear view of FIG. 4, the mounting bracket 18 has upwardly extending vertical tab portions 25 secured by the pivot 26 to its respective yoke portion 24 of the vertically extending cylindrical rod. The rod 22 extends through a central cylindrical bore of the mounting tab 28A at the rear wall 17 of the housing 11.

The pivot pin 26 provides for the adjustment of the inclination of the housing 11 with respect to the horizontal surface of the mounting bracket 18. The mounting bracket 18 is adapted for securement by conventional threaded fasteners through the horizontal rear deck surface adjacent the rear window of a vehicle. The pivot pin 26 allows a stiff adjustment of the rod 22 with respect to the tab portions 25 and may be replaced by a pivot bolt, if so desired.

FIG. 5 provides a perspective view, partially cutaway, of the interior construction of the device in FIG. 1 which further illustrates the embodiment 10 with the light lens 12 partially cutaway and, as shown in FIG. 2, the lens protrudes from within the U-shaped housing interior 14 adhered to the inside of the opaque front wall 16 which is hollowed out and configured in the design of a U-shaped arrow 12 so as to provide a light emitting window. The lens 12 is made of a light transmissive means such as translucent plastic, and is illuminated from within the housing interior 14 by the indicating light bulb 13 mounted in its lamp socket 15.

Means of energizing the signaling device 10 is provided and includes a switching apparatus (not shown) connected by an electrical cord 29 in a conventional fashion to the electrical system of the vehicle.

With respect to the above description then, it is to be realized that the optimum dimensional relationships for the parts of the invention to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Accordingly, the foregoing is considered as illustrative only of the principles of the invention. Further, since numerous modifications and changes will readily occur to those skilled in the art, it is not desired to limit the invention to the exact construction and operation shown and described, and thus, all suitable modifications and equivalents may be resorted to falling within the spirit and scope of the invention.

Now that the invention has been described, I claim:

1. An auxiliary U-turn signal attachment, comprising:
a U-shaped box-like housing;
an indicator light compartment;
a light transmitting lens forming a wall of said compartment;
a U-shaped arrow as indicator indicia on said lens and illuminated by an indicator light bulb;
adjustable mounting means for mounting said housing adjacent a rear window of a vehicle and for adjusting the height and inclination of said housing with respect to an intended mounting surface;
said adjustable mounting means including:
(a) a bracket having a plurality of apertures for reception of threaded fasteners;
(b) an elongated rod, pivotally mounted to said bracket and extending through a back portion of a mounting tab;
(c) said mounting tab secured to another wall of said housing, and said mounting tab having a cylindrical bore slidably receiving said rod; and
(d) a set screw in said mounting tab for clamping said rod in an adjusted height position.

* * * * *

UNITED STATES PATENT OFFICE
CERTIFICATE OF CORRECTION

Patent No. 5,003,289　　　　　　Dated March 26, 1991

Inventor(s)　　Leonardo E. Roman

It is certified that error appears in the above-identified patent and that said Letters Patent is hereby corrected as shown below:

On the title page, the inventor's first name is misspelled. The proper name should read "Leonardo".

On sheet 1 of 1 of the drawings, illustrated Figure 2 should be deleted and substitute therefore the attached Figures 1-5.

Signed and Sealed this

Sixth Day of October, 1992

*Attest:*

DOUGLAS B. COMER

*Attesting Officer*　　Acting Commissioner of Patents and Trademarks